United States Patent
Cho et al.

(10) Patent No.: US 9,540,257 B2
(45) Date of Patent: Jan. 10, 2017

(54) PLASMA SPARK DISCHARGE REACTOR AND DURABLE ELECTRODE

(71) Applicants: Young I. Cho, Cherry Hill, NJ (US); Daniel J. Cho, Wayne, PA (US); Alexander Fridman, Philadelphia, PA (US); Hyoungsup Kim, Lansdowne, PA (US)

(72) Inventors: Young I. Cho, Cherry Hill, NJ (US); Daniel J. Cho, Wayne, PA (US); Alexander Fridman, Philadelphia, PA (US); Hyoungsup Kim, Lansdowne, PA (US)

(73) Assignee: Drexel University, Philadelphia, PA (US)

(*) Notice: Subject to any disclaimer, the term of this patent is extended or adjusted under 35 U.S.C. 154(b) by 0 days.

(21) Appl. No.: 14/932,148

(22) Filed: Nov. 4, 2015

(65) Prior Publication Data

US 2016/0137529 A1    May 19, 2016

Related U.S. Application Data

(60) Provisional application No. 62/080,987, filed on Nov. 17, 2014.

(51) Int. Cl.
    *C02F 1/46*    (2006.01)
    *H05H 1/52*    (2006.01)
    *C02F 1/32*    (2006.01)

(52) U.S. Cl.
CPC .............. *C02F 1/4608* (2013.01); *H05H 1/52* (2013.01); *C02F 1/32* (2013.01); *C02F 2303/04* (2013.01); *H05H 2245/121* (2013.01)

(58) Field of Classification Search
USPC .... 250/432 R, 435, 436; 361/226, 227, 230; 422/22, 24, 186.04, 186.21; 210/712, 714, 210/751
See application file for complete search history.

(56) References Cited

U.S. PATENT DOCUMENTS

| | | | |
|---|---|---|---|
| 3,035,992 A | 5/1962 | Hougen | |
| 4,278,522 A | 7/1981 | Jacob et al. | |
| 4,805,069 A * | 2/1989 | Nagasaka | B05B 5/032 361/226 |
| 5,152,341 A | 10/1992 | Kasevich | |
| 5,858,202 A | 1/1999 | Nakamura | |

(Continued)

FOREIGN PATENT DOCUMENTS

| | | |
|---|---|---|
| EP | 1293481 B1 | 2/2007 |
| WO | WO2012153271 A1 | 11/2012 |

OTHER PUBLICATIONS

Sato, M., T., et al. "Formation of chemical species and their effects on microorganisms using a pulsed high-voltage discharge in water," IEEE Trans. Ind. Appl., 1996. 32(1): p. 106-112.

(Continued)

*Primary Examiner* — Kiet T Nguyen
(74) *Attorney, Agent, or Firm* — Mendelsohn Dunleavy, P.C.

(57) ABSTRACT

A plasma spark discharge reactor for treating water. The plasma spark discharge reactor comprises a HV electrode with a head and ground electrode that surrounds at least a portion of the HV electrode. A passage for gas may pass through the reactor to a location proximate to the head to provide controlled formation of gas bubbles in order to facilitate the plasma spark discharge in a liquid environment.

20 Claims, 15 Drawing Sheets

(56) References Cited

U.S. PATENT DOCUMENTS

| | | | |
|---|---|---|---|
| 5,871,623 | A | 2/1999 | Bakhir et al. |
| 6,099,703 | A | 8/2000 | Syversen et al. |
| 6,984,295 | B2 | 1/2006 | Shiue et al. |
| 7,090,753 | B2 | 8/2006 | Sumita |
| 7,419,603 | B2 | 9/2008 | Cho |
| 8,771,499 | B2 | 7/2014 | McCutchen et al. |
| 8,784,657 | B2 | 7/2014 | Cho et al. |
| 2012/0318671 | A1 | 12/2012 | McCutchen et al. |
| 2013/0062188 | A1 | 3/2013 | Dighe |
| 2013/0062191 | A1 | 3/2013 | Dighe |

OTHER PUBLICATIONS

Laroussi, M., "Low Temperature Plasma-Based Sterilization: Overview and State-of-the-Art," Plasma Processes and Polymers, 2005. 2(5): p. 391-400.

Locke, B.R., et al. "Review of the methods to form hydrogen peroxide in electrical discharge plasma with liquid water," Plasma Sources Science and Technology, 2011. 20(3): p. 034006.

Anpilov, A., et al. "Electric discharge in water as a source of UV radiation, ozone and hydrogen peroxide," J. Phys. D: Appl. Phys., 2001. 34(6): p. 993-999.

Labas, M.D., et al. "Kinetics of bacteria inactivation employing UV radiation under clear water conditions," Chem. Eng. J., 2006. 121: p. 135-145.

* cited by examiner

PLASMA SPARK DISCHARGE REACTOR AND DURABLE ELECTRODE

RELATED APPLICATION DATA

This application which claims priority to U.S. Provisional Application No. 62/080,987, filed Nov. 17, 2014, the entire disclosure of which is hereby incorporated by reference as if set forth fully herein.

STATEMENT OF GOVERNMENTAL INTEREST

This invention was made with government support under contract no. DE-AC26-07NT42677 awarded by the Department of Energy. The government has certain rights in the invention.

BACKGROUND OF THE INVENTION

1. Field of the Invention

The present invention is directed to water treatment. In particular the present invention is directed to the field of plasma spark discharge treatment of water and apparatus therefor.

2. Description of the Related Technology

Produced water refers to water that comes out of shale wells during the production of oil or gas, through a drilling process called hydraulic fracturing. During the drilling phase, the produced water is called flowback. Produced water can contain high concentrations of microorganisms, hydrocarbons, suspended solids, and dissolved inorganic solids.

Plasma spark discharge generators are used in the treatment of water. However, it is a challenge to produce a short-duration spark discharge in produced water because of the high electrical conductivity of produced water. The electrical conductivity of produced water is in the range of 100-200 mS/cm, which is approximately two to four times larger than that of sea water. As a result of this, the generation of a plasma spark discharge in the produced water is a significant challenge.

Previously, a number of researchers used gas bubbles in the generation of pulsed plasma spark discharge between two electrodes (i.e., HV electrode and ground electrode) in liquids. When externally supplied gas bubbles pass through the space between the HV electrode and ground electrode, a plasma spark discharge is more easily generated due to the lower conductivity of the gas in the bubble. In this case, however, the generation of the plasma spark discharge depends to some extent on the fluid dynamic motion of the gas bubbles. This motion is difficult to control since control must be exerted over each of the size, location and frequency of the bubbles. Thus, a better system than those employing gas bubbles from an external source is required to generate a highly reliable, pulsed plasma spark discharge at a predetermined location, time and frequency (for example, at 10 pulses per second).

The previous methods of using gas bubbles in a liquid to generate a pulsed plasma spark discharge utilized two electrodes, a HV electrode 102 and a ground electrode 104, as shown in FIG. 1, with their active surfaces facing each other. The gas bubbles 103 are provided by the gas injector 105 and pass between the HV electrode 102 and ground electrode 104. When a properly sized gas bubble 103 passes at a specific location between the HV electrode 102 and ground electrode 104, a pulsed plasma spark discharge is generated. However, if the size of a gas bubble 103 is too small, the pulsed plasma spark discharge may not be generated. Additionally, if the gas bubble 103 passes the HV electrode 102 and ground electrode 104 too quickly, the plasma spark discharge may not be generated. Since the size and velocity of a gas bubble 103 are not easily controlled in a water-carrying pipe, the HV electrode 102 and ground electrode 104 must be specially adapted to provide reliable plasma spark discharge. However, even the proposed geometry using a HV electrode 102 and ground electrode 104 facing each other with gas bubbles 103 passing between them does not provide an environment that can be precisely controlled in order to permit generation of a reliable plasma spark discharge.

Therefore, there is a need to control the introduction of gas bubbles to an apparatus for generating a plasma spark discharge more precisely. More specifically, it is desirable to provide more precise control of, for example, the size of the gas bubbles and the location of the gas bubbles relative to the HV electrode and ground electrode. More precise control would be able to provide a reliable plasma spark discharge in water such as is requried for consistent water treatment.

Additionally, there is a need for a more durable electrode in the application of plasma spark discharge to water and produced water. Specifically, some electrodes made of a sharp needle shape currently suffer from the problem of electrode erosion when employed in a plasma spark discharge reactor of the type shown in FIG. 1.

A durable electrode that is free of erosion, together with a high degree of control of the gas introduced to the system to facilitate generation of a plasma spark discharge is needed.

Such an improved plasma spark discharge reactor will permit generation of reliable pulsed plasma spark discharges at a more precise location in even a highly conductive liquid medium at a predetermined time and/or frequency (i.e., the number of pulses per second), as desired for effective water treatment.

SUMMARY OF THE INVENTION

An aspect of the present invention may be a plasma spark discharge reactor comprising: a HV electrode having a rounded head; a ground electrode substantially surrounding at least a portion of the HV electrode; and a gas passage extending to an outlet proximate to the head of the HV electrode.

Another aspect of the present invention may be a water treatment system comprising, a chamber for holding produced water; and a plasma spark discharge reactor comprising: a HV electrode having a rounded head; and a ground electrode substantially surrounding at least a portion of the HV electrode and a gas passage extending to an outlet proximate to the rounded head of the HV electrode.

Still yet another aspect of the present invention may be a plasma spark discharge reactor comprising: a HV electrode having a rounded head; a ground electrode substantially surrounding at least a portion of the HV electrode; and a gas passage extending to an outlet proximate to the rounded head of the HV electrode.

DETAILED DESCRIPTION OF THE PREFERRED EMBODIMENTS

For illustrative purposes, the principles of the present disclosure are described by referencing various exemplary embodiments. Although certain embodiments are specifically described herein, one of ordinary skill in the art will readily recognize that the same principles are equally applicable to, and can be employed in other systems and methods.

Before explaining the disclosed embodiments of the present disclosure in detail, it is to be understood that the disclosure is not limited in its application to the details of any particular embodiment shown. Additionally, the terminology used herein is for the purpose of description and not of limitation. Furthermore, although certain methods are described with reference to steps that are presented herein in a certain order, in many instances, these steps may be performed in any order as may be appreciated by one skilled in the art; the novel methods are therefore not limited to the particular arrangement of steps disclosed herein.

It is to be noted that as used herein and in the appended claims, the singular forms "a", "an", and "the" include plural references unless the context clearly dictates otherwise. Furthermore, the terms "a" (or "an"), "one or more" and "at least one" can be used interchangeably herein. The terms "comprising", "including", "having" and "constructed from" can also be used interchangeably.

As used herein "produced water" refers to water that comes out of shale wells during the production of oil or gas, through a drilling process called hydraulic fracturing.

As used herein, "vertical" refers to an orientation of the head of the plasma spark discharge device in the direction of gravity or an orientation of the chamber such that liquid flow in the chamber is parallel to the direction of gravity. As used herein, "horizontal" refers to an orientation of the head of the plasma spark discharge device in a direction perpendicular to the direction of gravity or an orientation of the chamber such that liquid flow within the chamber moves perpendicular to the direction of gravity. Horizontal or vertical orientations also include orientations that are substantially horizontal or substantially vertical. By substantially vertical is meant any orientation within 45 degrees of vertical. By substantially horizontal is meant any orientation within 45 degrees of horizontal.

Figure 2:
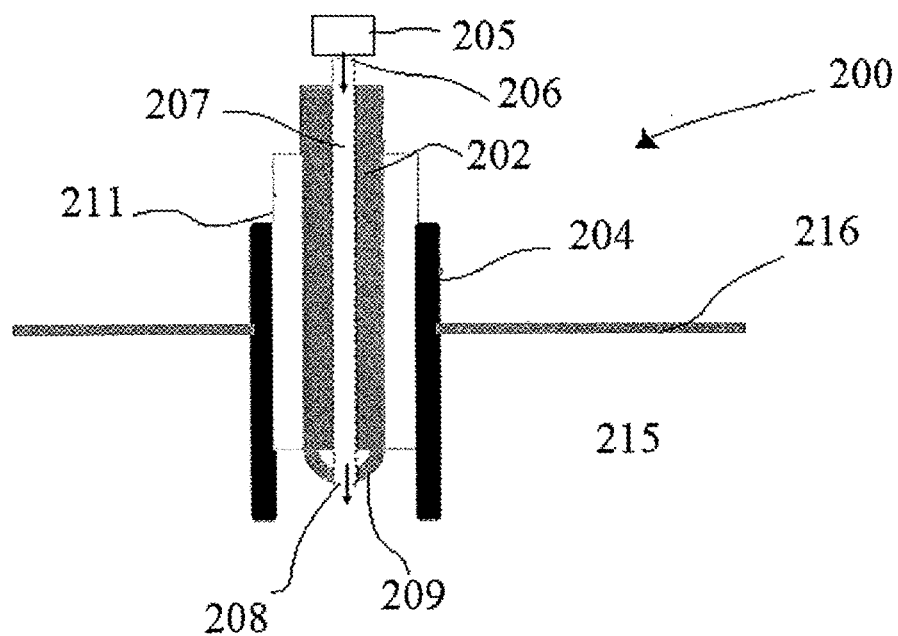
FIG. 2 is a schematic view of a plasma spark discharge reactor in accordance with an embodiment of the present invention.

A embodiment the plasma spark discharge (PSD) reactor 200 is shown in FIG. 2. The PSD reactor 200 has a negative HV electrode 202 and ground electrode 204 that are arranged such that the ground electrode 204 surrounds at least a portion of the HV electrode 202. The HV electrode 202 and ground electrode 204 may be made of stainless steel. In FIG. 2 the HV electrode 202 and ground electrode 204 are arranged coaxially. The coaxial arrangement of the HV electrode 202 and ground electrode 204 permits a portion of the PSD device to be located in a chamber 215 by being passed through a chamber wall 216. The chamber 215 typically contains water or some other fluid that is to be treated by a fluid treatment system. Both the HV electrode 202 and the ground electrode 204 may extend into the chamber 215 from a location outside of the chamber 215. During use of the PSD reactor 200 the chamber 215 is filled with the fluid to be treated, for example, water The HV electrode 202 may be provided with a rounded head 209. By "rounded head" it is meant that the head 209 of HV electrode 202 has a hemispherical shape. Ground electrode 204 forms an outer cylindrical casing in the embodiment of FIG. 2. The ground electrode 204 surrounds or substantially surrounds at least a portion of the HV electrode 202 and may be coaxial with the HV electrode 202.

As shown in FIG. 2, an insulator 211 may be located between the HV electrode 202 and the ground electrode 204. Insulator 211 may also surround HV electrode 202. Both the insulator 211 and the HV electrode 202 may be surrounded by the ground electrode 204. The insulator 211 may be made of glass-filled Teflon, which can withstand the high-temperatures and the high-mechanical forces (e.g., impact forces) produced by a pulsed plasma spark discharge.

Power can be supplied to the HV electrode 202 and/or ground electrode 204 by a power supply (not shown) operably connected to the HV electrode 202 and/or ground electrode 204. The power supply has to be capable of providing sufficient power to either HV electrode 202 or ground electrode 204 to generate the plasma spark discharge.

A gas injector 205 may be operably connected to a gas passage 207 located in the PSD reactor 200. The gas injector 205 introduces gas into the gas passage 207 through an inlet 206. The injected gas may be air, nitrogen, oxygen, etc. The gas passage 207 extends longitudinally through the HV electrode 202 and has an outlet 208 located in the rounded head 209 of the HV electrode 202. Gas that passes through the gas passage 207 takes the form of bubbles when released into the liquid located in the chamber 215.

Figure 3:
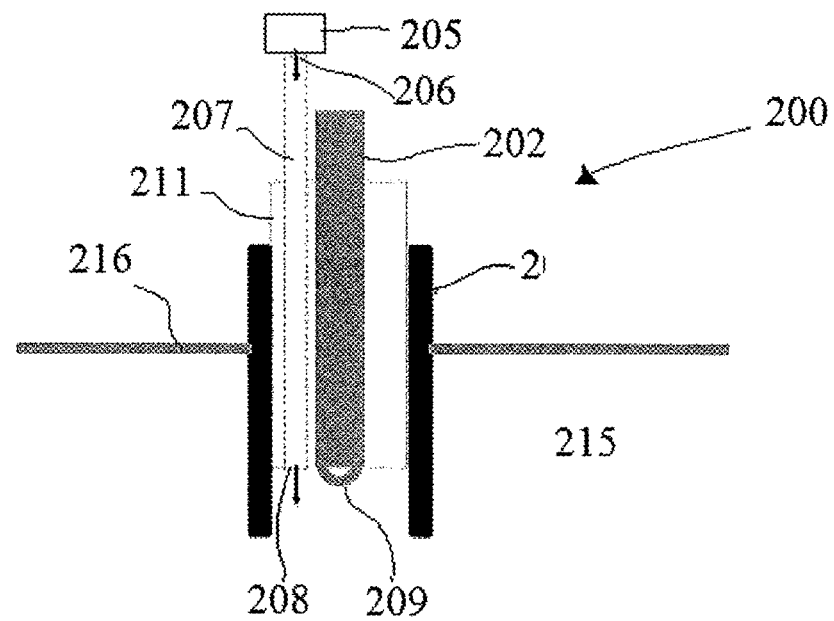
FIG. 3 is a schematic view of an alternative embodiment of the plasma spark discharge reactor.

FIG. 3 is a schematic view of an alternative embodiment of a PSD reactor 200 in accordance with the invention. In the embodiment shown in FIG. 3, the gas passage 207 is located between the HV electrode 202 and the ground electrode 204 and extends longitudinally through the insulator 211. In this embodiment, the gas passage 207 may be equidistant from the HV electrode 202 and the ground electrode 204. Gas traveling through gas passage 207 exits through an outlet 208 located between the rounded head 209 of the HV electrode 202 and the ground electrode 204.

Figure 4:
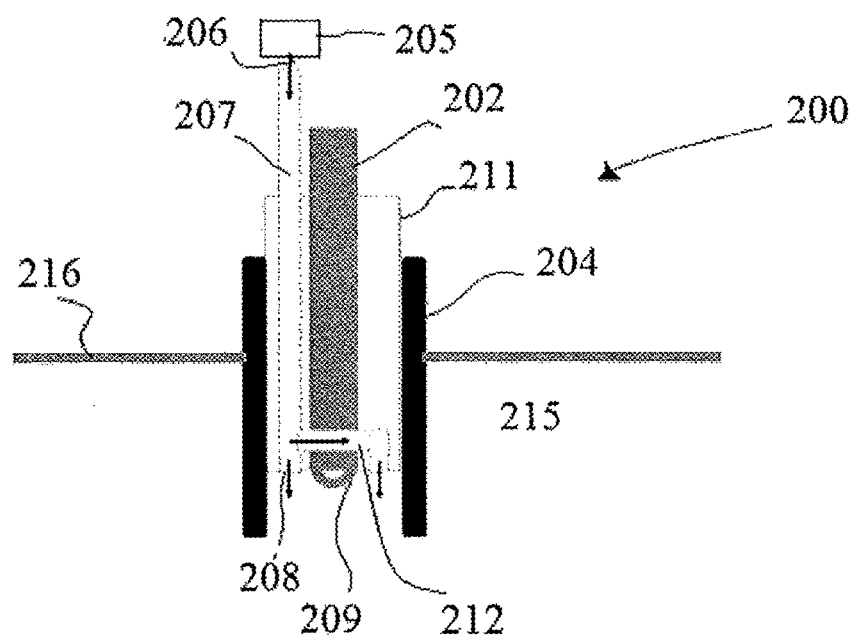
FIG. 4 is a schematic view of yet another alternative embodiment of the plasma spark discharge reactor.

FIG. 4 is a schematic view of another embodiment of a PSD reactor 200 in accordance with the invention. In this embodiment, the gas passage 207 extends through the insulator 211 as in the embodiment of FIG. 3 but is also provided with an additional side passage 212 that passes through or around the HV electrode 202 to a second outlet in insulator 211. The side passage 212 may extend orthogonally from the gas passage 207 to another portion of the insulator 211 and eventually the second outlet. In the embodiment shown in FIG. 4 the side passage 212 extends to a second outlet located to release gas on an opposite side of the rounded head 209 from first outlet 208. Releasing the gas on both of opposite sides of the rounded head 209 improves control of the gas bubbles during the plasma spark discharge process.

Figure 5:
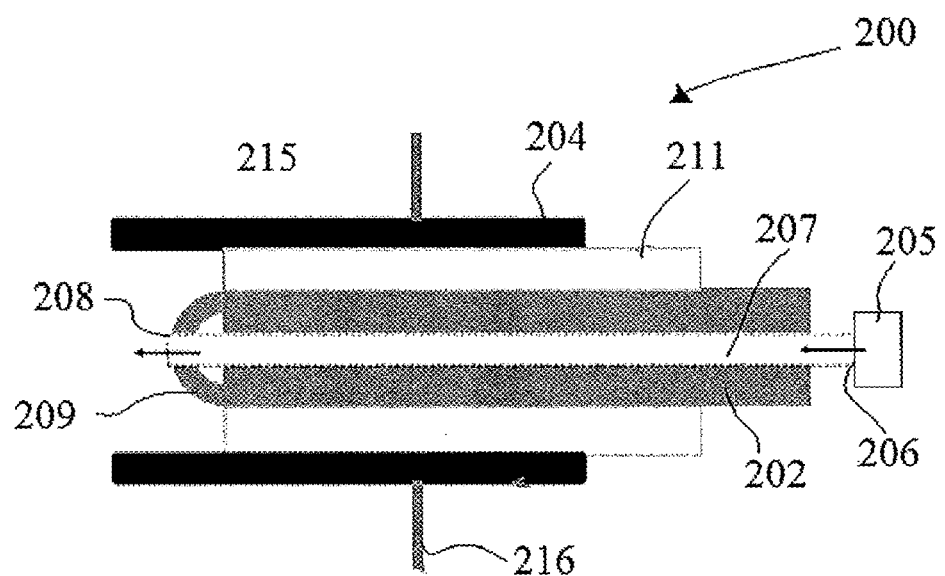
FIG. 5 is a schematic view of a further alternative embodiment of the plasma spark discharge reactor.

FIG. 5 is a schematic view of yet another alternative embodiment of the PSD reactor 200. The embodiment shown in FIG. 5 is similar to the embodiment shown in FIG. 2, except that the HV electrode 202, ground electrode 204 and gas passage 207 pass horizontally through a wall 216 of the chamber 215 rather than vertically through a wall 216 of the chamber 215 as in the embodiment of FIG. 2. This difference alters the effect of gravity on the gas released from outlet 208 in the PSD. Thus, in this embodiment gas exiting through the outlet 208 in the head 209 of HV electrode 202 forms bubbles that rise vertically in a direction perpendicular to head 209 in the liquid located within the chamber 215.

Figure 6:
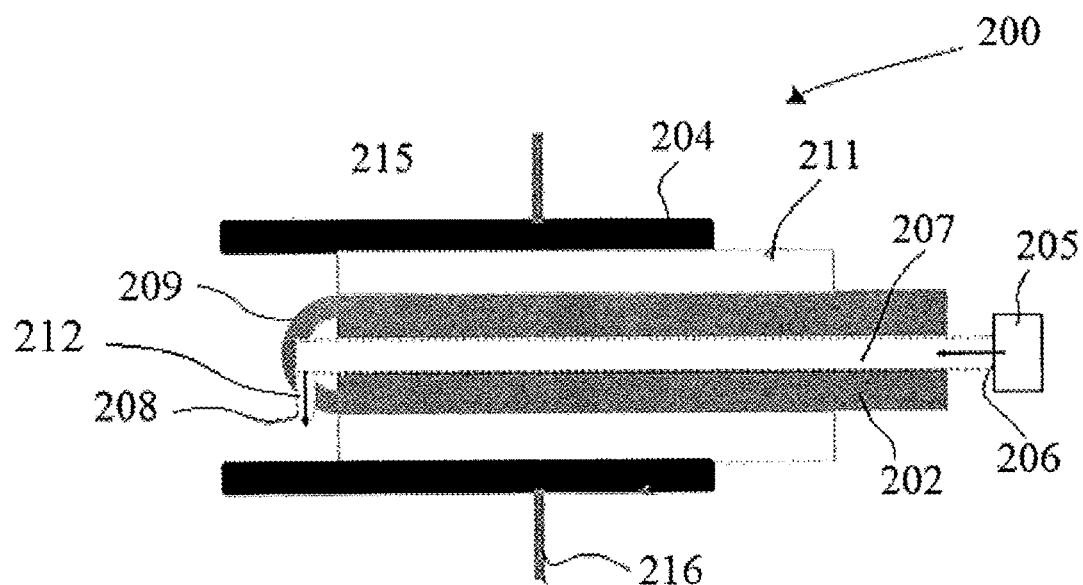
FIG. 6 is a schematic view of a further alternative embodiment of the plasma spark discharge reactor.

FIG. 6 is a schematic view of yet another alternative embodiment of the PSD reactor 200. In FIG. 6 the HV electrode 202, ground electrode 204 and gas passage 207 also pass horizontally through the wall 216 of the chamber 215 as in the embodiment of FIG. 5. The gas passage 207 extends longitudinally through the center of the HV electrode 202 in a horizontal direction as shown. The gas passage 207 bends to a side passage 212 that extends orthogonally from the gas passage 207 at a location proximate the distal end of gas passage 207. The side passage 212 may alternatively extend from the gas passage 207 at an angle other than the depicted right angle. The gas outlet 208 is located so that gas exits downwardly from the outlet 208 of side passage 212. Gas bubbles generated by release of gas from this downwardly oriented outlet 208 will rise in the liquid located within the chamber 215 around head 209 of HV electrode 202.

Figure 7:
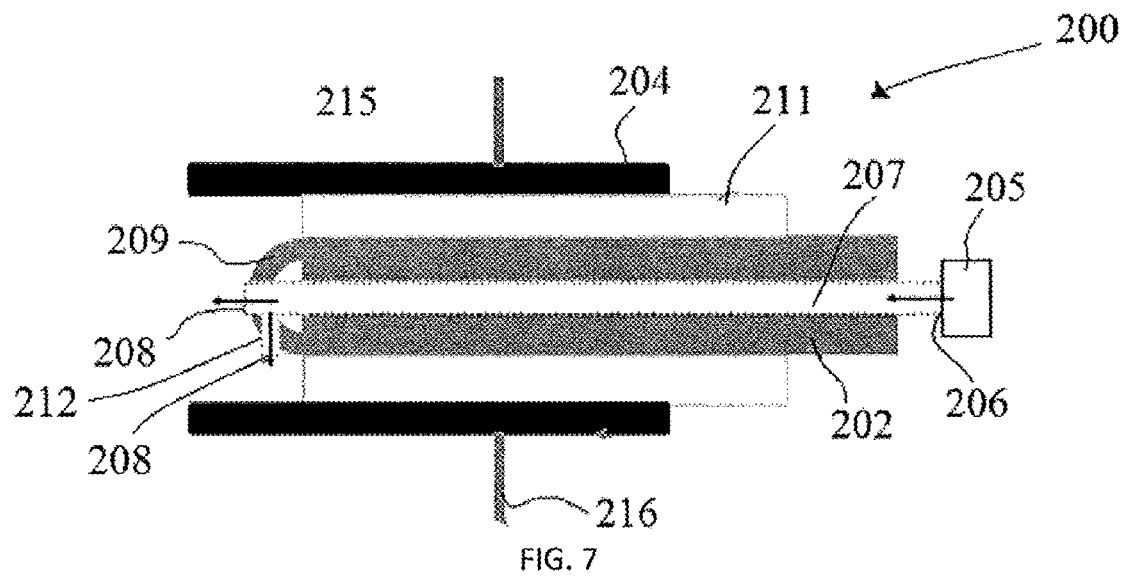
FIG. 7 is a schematic view of a further alternative embodiment of the plasma spark discharge reactor.

FIG. 7 is a schematic view of yet another alternative embodiment of the PSD reactor 200. In FIG. 7 the HV electrode 202, ground electrode 204 and gas passage 207 also pass horizontally through the wall 216 of the chamber 215. The gas passage 207 has a side passage 212 that extends orthogonally from the gas passage 207. The side passage 212 may alternatively extend from the gas passage 207 at an angle other than the depicted right angle. The side passage 212 has a gas outlet 208 that is oriented downwardly so that gas bubbles created by gas exiting side passage 212 via the downwardly directed gas outlet 208 will rise in the liquid located within the chamber 215 around head 209 of HV electrode 202. The gas passage 207 also extends horizontally through the HV electrode 202 to a horizontally oriented gas outlet 208 that is located in the rounded head 209 of the HV electrode 202.

Figure 8:
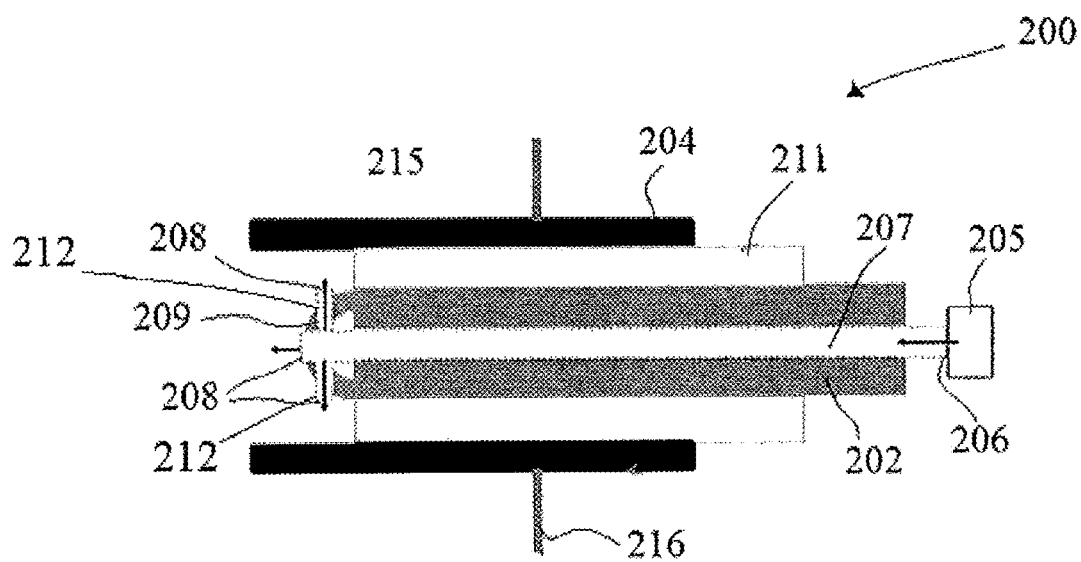
FIG. 8 is a schematic view of a further alternative embodiment of the plasma spark discharge reactor.

FIG. 8 is a schematic view of a further alternative embodiment of the PSD reactor 200. In FIG. 8 the HV electrode 202, ground electrode 204 and gas passage 207 also pass horizontally through the wall 216 of the chamber 215. The gas passage 207 is provided with two side passages 212 that extend orthogonally from the gas passage 207. The side passages 212 may alternatively extend from the gas passage 207 at an angle other than the depicted right angle. One of the gas outlets 208 is located so that gas is released downwardly and gas bubbles created by this downward release of gas will rise in the liquid located within the chamber 215. There is also a gas outlet 208 located in the rounded head 209 of the HV electrode 202 which releases gas horizontally and thus also permits gas bubbles to rise in the liquid located within the chamber 215. Another gas outlet 208 is located so that gas is released upwardly out of a side passage 212 located in the rounded head 209 of the HV electrode 202.

Figure 9:
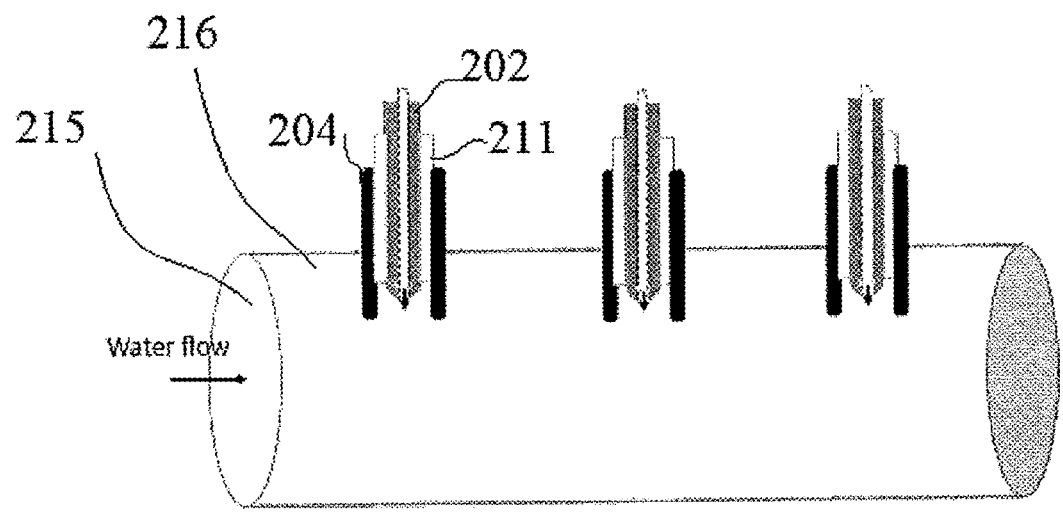
FIG. 9 shows a plasma spark discharge reactor with a plurality of HV electrodes and ground electrodes.

FIG. 9 shows an alternative embodiment of the PSD reactor 200 with a plurality of HV electrodes 202 and ground electrodes 204 that are positioned vertically along the wall 216 of the chamber 215. The embodiment of FIG. 9 may employ any combination of the vertically oriented PSD devices shown in FIGS. 2-5.

Figure 10:
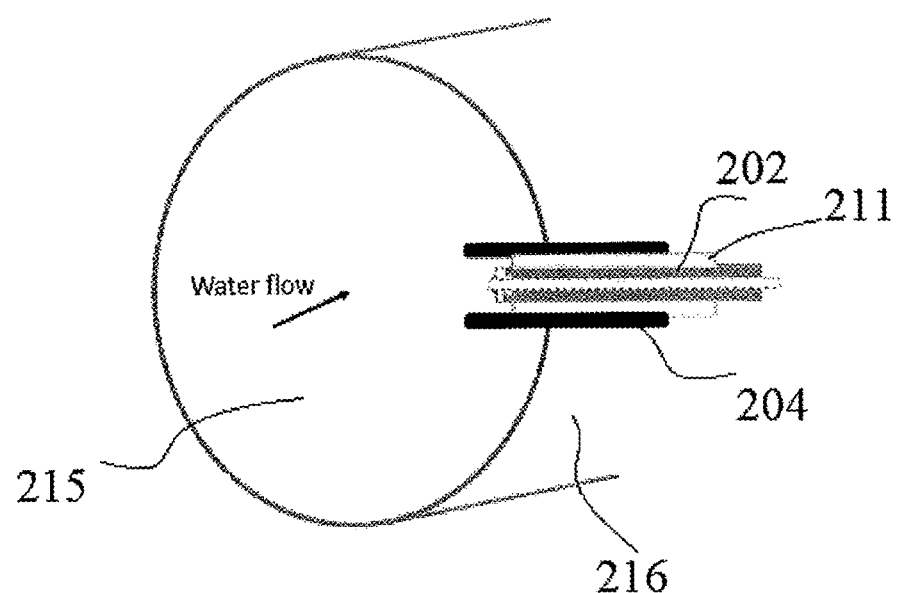
FIG. 10 shows an alternative embodiment of the plasma spark discharge reactor with the HV electrode and ground electrode mounted on a chamber.

FIG. 10 shows an alternative embodiment of the PSD reactor 200 with a HV electrode 202 and ground electrode 204 positioned horizontally and passing through the wall 216 of a chamber 215 that is also oriented horizontally.

Figure 11:
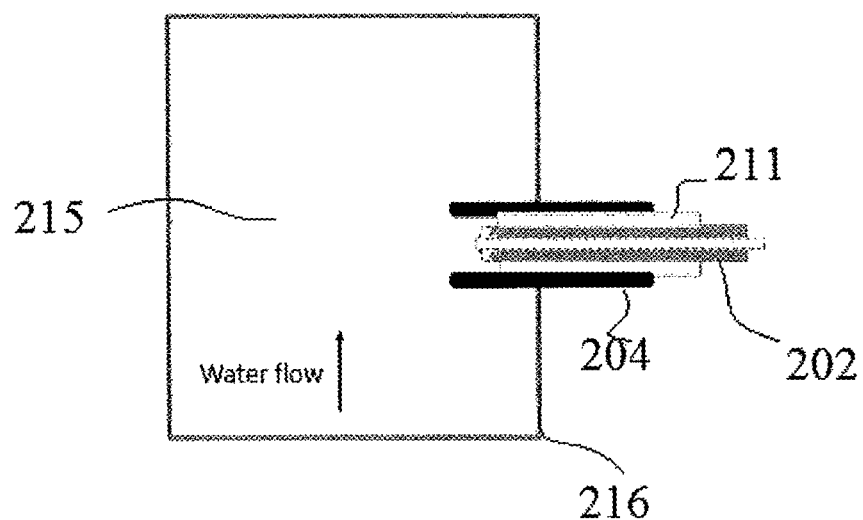
FIG. 11 shows another alternative embodiment of the plasma spark discharge reactor with the HV electrode and ground electrode mounted on a chamber.

FIG. 11 shows an alternative embodiment of the PSD reactor 200 with a HV electrode 202 and ground electrode 204 positioned horizontally and passing through the wall 216 of a chamber 215 that is oriented vertically.

Figure 1:
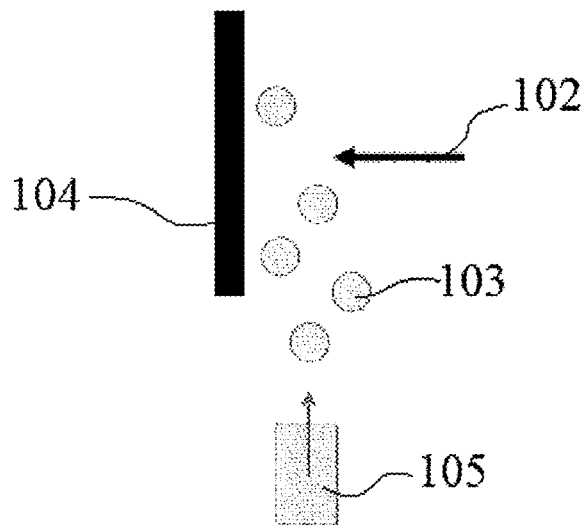
FIG. 1 is a simplified view of a prior art plasma spark discharge reactor.

The various embodiments of the PSD reactors 200 shown and described above each provide a durable electrode geometry for the generation of pulsed plasma spark discharges, especially in highly conductive water. The rounded head 209 of the PSD reactor 200 greatly reduces or altogether eliminates the problem of head erosion when compared with a conventional needle-tip electrode, such as that shown in FIG. 1. The coaxial geometry of the HV electrode 202 and ground electrode 204 means that both electrodes located on the same side of chamber 215 and not facing each other as in the embodiment of FIG. 1. These novel geometric arrangements of the HV electrode 202, the ground electrode 204 and the gas passage 207 in accordance with the present invention allow the PSD reactor 200 to supply gas bubbles more precisely to a location between the HV electrode 202 and the ground electrode 204 to enable more reliable generation of plasma spark discharges.

Further, the PSD reactor 200 of the present invention is also able to reliably supply the gas bubbles at a desired frequency. Certain of these inventive arrangements of the parts in the PSD reactors 200 confer the ability to generate pulsed plasma spark discharges at multiple locations in a chamber 215 (such as that shown in FIG. 9) with a reliable degree of control.

Additionally, the coaxial HV electrode 202 and ground electrode 204 configuration allows the PSD device to be inserted through a single orifice in the wall 216 of a chamber 215. By creating a single-piece coaxial HV electrode 202 and ground electrode 204 set, the installation of multiple PSD devices along a wall 216 of a chamber 215 is facilitated. Having multiple HV electrode 202 and ground electrode 204 sets permits larger volumes of liquid to be treated within the PSD reactor 200 per unit time. This arrangement is preferable to devices arranged with the HV electrode 202 and ground electrode 204 facing each other, wherein an enclosed reactor of a given volume is only capable of accommodating one set of HV electrodes and ground electrodes.

In preferred embodiments the ground electrode 204 extends to at least the same plane as head 209 of HV electrode 202 and, as shown in FIGS. 2-9, preferably extends somewhat beyond head 209 of HV electrode 202. This creates a semi-enclosed space between an interior surface of ground electrode 204 and head 209 of HV electrode 202. The injection of gas into the liquid that is confined in the semi-enclosed space created by the combination of the HV electrode 202 and ground electrode 204 causes the gas to displace liquid from the semi-enclosed space. As a result, the injection of the gas into the semi-enclosed space increases the reliability of the PSD device by using confinement of the gas, in combination with gravitational and buoyancy forces to provide a more consistent generation and location of gas bubbles relative to head 209. Once sufficient gas is introduced to the confined space surrounded by the HV electrode 202 and ground electrode 204, the gas will fill at least a portion of the confined space thereby bridging the HV electrode 202 and ground electrode 204. The buoyancy of the gas in the liquid is used to direct the flow of gas bubbles in a desired direction and to help confine or trap the gas in the semi-enclosed space since, in various embodiments, a surface of the HV electrode 202 or ground electrode 204 acts as a ceiling that prevents a portion of the gas from rising further in the liquid. A pulsed plasma spark discharge is initiated at the precise moment when the gas sufficiently fills the confined space to bridging the HV electrode 202 and ground electrode 204.

The coaxial arrangement of the HV electrode 202 and ground electrode 204 with the gas passage 207 provides a more powerful and intense ultraviolet (UV) component as a result of the more precise control of the gas injection into the space that is semi-confined by the HV electrode 202 and ground electrode 204. A series of reliable plasma spark discharges initiated at a predetermined or desired frequency enables the intensity of the UV component to be increased, thereby enhancing the performance of the water treatment and microbiological inactivation. The composition of air or the injection of different gases, such as air, nitrogen, oxygen, etc. may be controlled to produce a certain combination of active species as a result of spark plasma discharge. The active chemical species generated by plasma spark discharge in air enhances the intense UV effect thereby increasing microbial deactivation.

The coaxial arrangement of the HV electrode 202 and ground electrode 204 with the gas passage 207 provides spark discharges in water, generating powerful shock waves at a frequency of approximately 8-10 Hz. The shock waves help water to be mixed inside the PSD and rupture the fragile membrane of microorganisms such as sulfate-reducing bacteria (SRB) and acid-producing bacteria (APB), assisting the disinfection process of plasma.

By using different gases (for example, air or nitrogen gas), the pH of the treated liquid can also be controlled. For example, the pH of the liquid may be decreased to a relatively low or acidic pH level such as pH 3, thereby further enhancing the liquid treatment by adding the effect of pH to the treatment regimen.

Discussed below is an example showing the use of a PSD reactor 200 in accordance with the present invention.

EXAMPLE

Reference is made to FIG. 2 in relation to the following example. A study was performed in order to determine the effectiveness of plasma spark discharge treatment on the inactivation of acid-producing bacteria (APB) and sulfate-reducing bacteria (SRB) in produced water. Produced water was treated by plasma spark discharge generated using the arrangement shown in FIG. 2. The PSD reactor 200 used a high-voltage center electrode 202 and a grounded outer cylindrical electrode 204. In order to enhance the effectiveness of the spark discharges, small amounts of water and gas were introduced to the plasma spark discharge reactor 200 through a gas passage 207 inside the high voltage electrode 202, which was itself submerged in a volume of produced water.

Both static and dynamic tests were conducted using a plasma reactor containing 1.8-L of produced water. In the static test, produced water was treated over a period of 10 minutes, and samples were taken at discrete time intervals for APB and SRB concentration measurements using the most probable number (MPN) method. In the dynamic test, produced water was pumped through the PSD reactor 200 in a once-through mode at three different flow rates of 1, 3, and 5 gpm, and samples were taken before and after the treatment by the PSD reactor 200. In addition, the residual effect of the plasma spark discharge treatment was assessed by two different incubation schedules: (1) incubation started immediately after the completion of the plasma spark discharge treatment and (2) incubation started 24 hours after the completion of the plasma spark discharge treatment.

In the static test, both water samples (i.e., immediate and 24-hour delay incubation) showed a total of a 4-log reduction of SRB based on cfu counts in cases of 10 minutes of plasma treatment, indicating complete inactivation of SRB. In the dynamic test, a 2-log reduction of APB was observed for the case of semi-transparent produced water at flow rates of 1 and 3 gpm, whereas 1-log to 1.5-log reductions of APB were observed for the case of dark produced water at flow rates of 1, 3, and 5 gpm.

In the dynamic test, the energy cost varied within a range of 1.5-10 kJ/L/1-log reduction, decreasing with increasing flow rate. The best energy cost for APB treatment was a 1.5 kJ/L/1-log reduction, which was achieved in the dynamic test. In general, spark discharge produced strong anti-microbial effects, which increased with plasma treatment time in the case of static tests, and increased with higher flow rates in dynamic tests.

Plasma inactivation is one of the most promising physical water treatment methods for the inactivation of microorganisms in water. The inactivation effect has been attributed to the presence of active plasma species, i.e., $OH^-$, $O$, $O_2^*$, $O_{3+}$, $H_2O_2$, N atom, NO, $NO_2$, UV radiation, shock waves, and electric fields produced by plasma discharge [1-3]. Each of these plasma species may play a role in the inactivation of microorganisms [2]. However, most of these active species have a very short half-life on the order of microseconds or less, except for $O_3$ and $H_2O_2$ [4-6]. The plasma spark discharge of the present invention is able to generate a large amount of active plasma species because of its unique plasma properties and the controlled gas flow introduced within the PSD reactor 200.

Maximizing concentrations of reactive species in water, as well as maximizing UV irradiation generated by the plasma spark discharge are desirable for bacterial inactivation. When a volume of produced water is treated in a static test by plasma spark discharge for a prolonged period of time, it is possible to achieve maximum exposure of the entire volume to the UV radiation emitted by the spark discharge with a relatively small energy cost of 0.4 kJ/L/1-log reduction if the water is transparent [7].

In the case of dark or darker produced water, the penetration depth of the UV radiation is reduced, rendering the UV radiation less effective. In addition, since the most reactive species produced by the plasma spark discharge have extremely short half-lives of microseconds, the water molecules very close to the actual plasma spark discharge are the only ones that come into contact with these active species. Accordingly, effective treatment in a static system is not expected as the entire volume is not expected to have uniform contact with the reactive species produced.

On the other hand, when the water is treated in a dynamic system, most of the water molecules can actually pass very close to the plasma spark discharge, thereby coming in contact with the UV radiation and active species generated by the plasma spark discharge. However, the residence time of the water is decreased significantly within the plasma spark discharge reservoir due to the flow of the water in the dynamic system. Thus, it is expected that the treated water will have a significantly lower exposure time, for example, to the UV radiation, than in the static system, but that the exposure in the dynamic system will be more effective than in the static system due to mixing of the water that occurs in the dynamic system. Furthermore, the mixing of the produced water in the dynamic system will result in a substantially larger portion of the volume of produced water that comes in contact with the reactive species than would be the case in the static system.

Accordingly, the present study was based on the hypothesis that the inactivation of bacteria by the UV radiation can be accomplished instantaneously [8], while the inactivation by the reactive species requires direct contact (i.e., via a diffusion process), whereby mixing of produced water should be a determinative condition for effective inactivation of bacteria.

Thus, the objective of the study of dynamic liquid treatment was to investigate the effectiveness of spark discharge treatment on the inactivation of both APB and SRB in produced water. In addition, the study also investigated the plasma energy cost of the plasma spark discharge treatment of produced water, including a study on the residual effects of anti-microbial properties of plasma-treated produced water.

Figure 12:
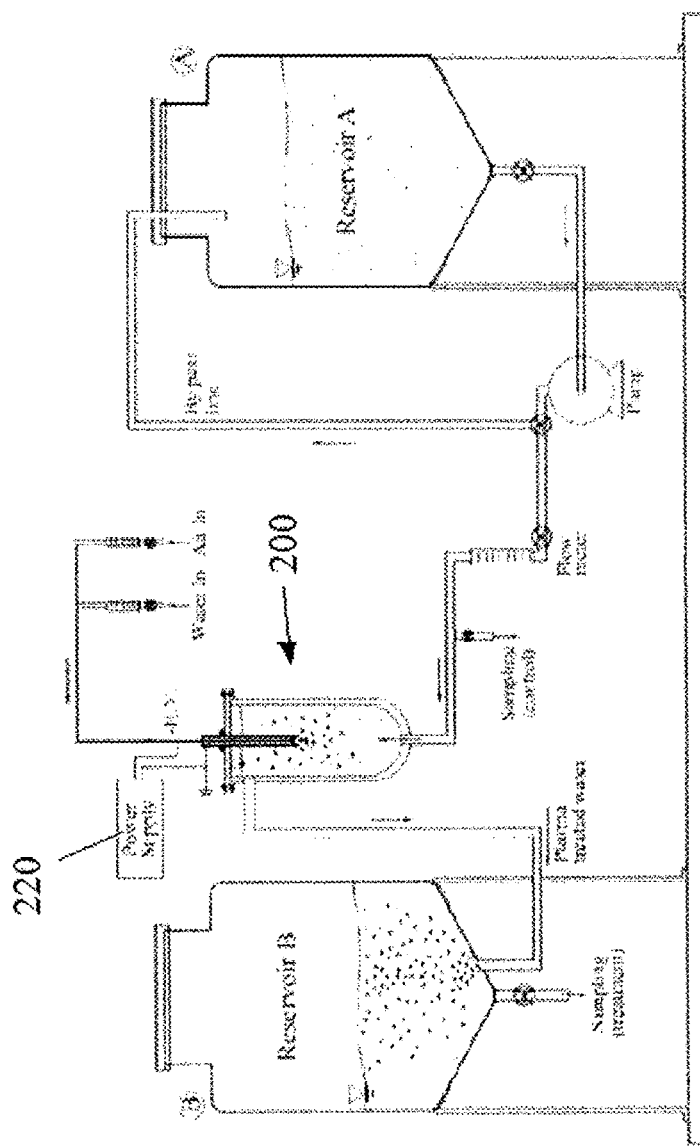
FIG. 12 is a diagram of the experimental setup for a dynamic plasma spark discharge treatment system.
Figure 13:
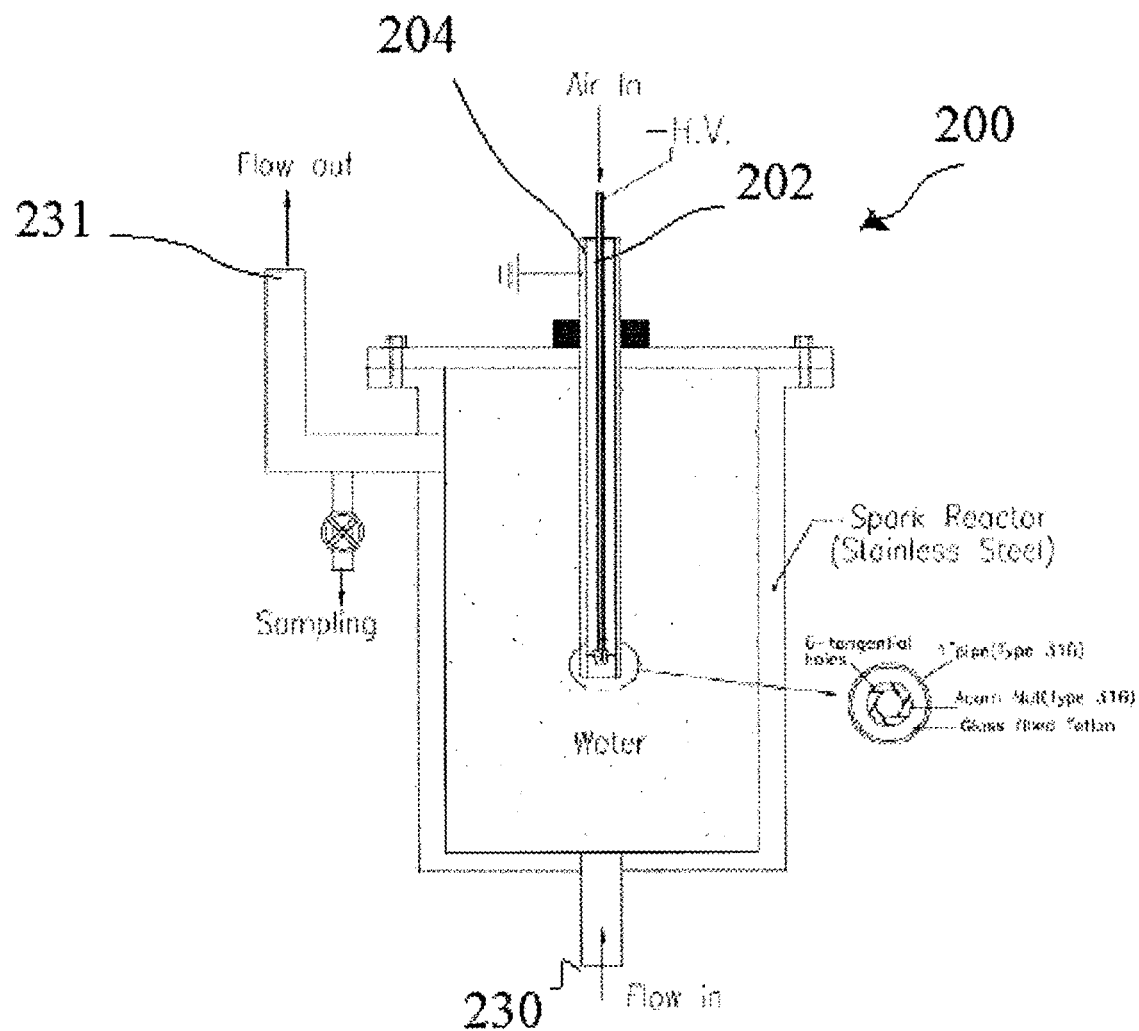
FIG. 13 is a diagram of an experimental setup useful for both a dynamic and static plasma spark discharge treatment system.

The experimental setup utilized in the present study for the dynamic liquid treatment system is illustrated in FIG. 12. This test setup consisted of three major parts: the first part being comprised of a PSD reactor 200 driven by its own power supply 220 and contained within a 1.8 L reservoir. The second part was made of air- and water-transport systems to provide controlled flows of air and water to the PSD reactor 200. These two parts are shown in FIG. 13. The third part comprised two holding reservoir tanks—one to store the pre-treated bacteria-containing produced water and the second to store the aerated plasma-treated produced water. The basic approach in the study for this dynamic system was to have both air and produced water pass through the coaxial HV electrode 202 and ground electrode 204 configuration, which was itself immersed in a volume of the same produced water. In this configuration, the plasma was discharged at the gas-liquid interface at the end of the coaxial electrode, allowing it to come in direct contact with the contaminated water which was circulated through the plasma reactor from reservoir A to reservoir B via a standard centrifugal pump.

In order to provide a fixed airflow of 10 standard cubic feet per hour through the PSD reactor 200, an air compressor was used. The airflow rate was controlled with a valve and a pressure regulator. Similarly, to provide a fixed water flow of 30 mL/min. through the same configuration of the HV electrode 202 and ground electrode 204, a micro flowmeter was used.

The experimental setup that was utilized in the present study for the static treatment system is illustrated in FIG. 13. This test setup consisted of two of the three major parts listed in the dynamic system setup—(1) PSD reactor 200 driven by its own power supply and contained within a 1.8 L reservoir, and (2) the air- and water-transport systems through the coaxial HV electrode 202 and ground electrode 204 to provide controlled flows of air and water to the PSD reactor 200. The basic approach for this static system was similar to the dynamic system approach, except that a static, uncirculated 1.8 L of produced water was plasma-treated within the PSD reactor 200.

The PSD reactor 200 shown in FIG. 13 used a three-dimensional plasma spark discharge setup. In order to generate plasma spark discharges, a vertically positioned, coaxially arranged HV electrode 202 and ground electrode 204 were used. The coaxially arranged HV electrode 202 and ground electrode 204 consisted of a negative high voltage center HV electrode 202 connected to an HV power supply 220 and an outer cylindrical ground electrode 204 with a gap distance of 5 mm between the HV electrode 202 and the ground electrode 204 measured in the radial direction. The gap distance may be between 1-10 mm, preferably between 3-8 mm. Both ground electrode 204 and HV electrode 202 were made of 316 stainless steel tubes and electrically separated by an insulating material (i.e., glass-filled Teflon) for safe operation. It is noted that produced water to be treated in the PSD reactor 200 was not permitted to make direct contact with the high voltage electrode 202 in order to ensure safe operation.

In order to initiate and sustain plasma spark discharges, the vertically positioned coaxially arranged HV electrode 202 and ground electrode 204 were operated with a mixture of air and water discharged into the space between the HV electrode 202 and the ground electrode 204. In order to discharge the mixture of air and water into the space between the HV electrode 202 and the ground electrode 204, a small amount of produced water was injected into the compressed air line at a location upstream of the PSD reactor 200. Then, the mixture of air and water was radially discharged through six small holes in the rounded head 209 of the HV electrode 202. The flow rate of water was 30 mL/min, while the airflow rate was 10 standard cubic feet per an hour, an optimal condition for the PSD reactor 200.

Figure 14:
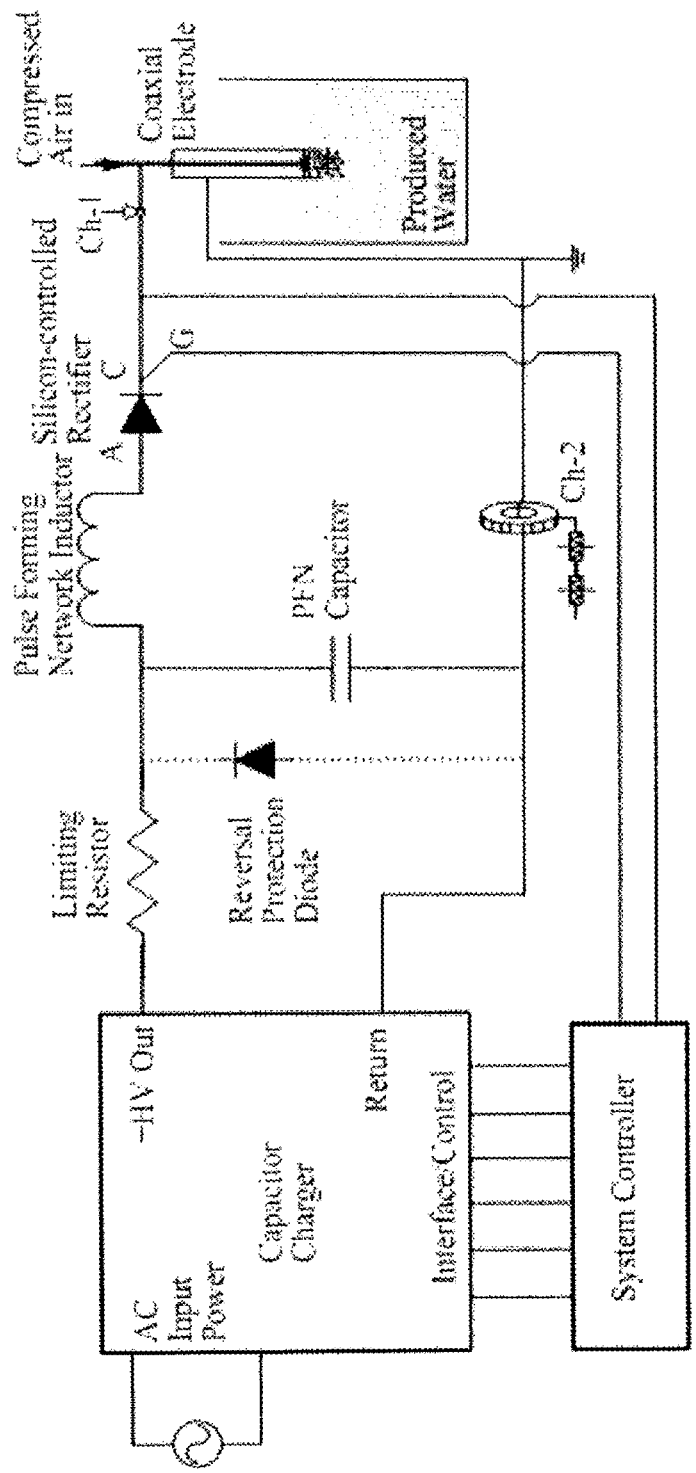
FIG. 14 is a circuit diagram of a power supply connected with a plasma spark discharge reactor.

FIG. 14 shows a schematic circuit diagram of the power supply 220 used in the study, which was designed to produce a short plasma spark discharge pulse in high electric conductivity water at a frequency of 8 Hz. The power supply mainly consisted of a capacitor charging high-voltage power supply, a silicon controlled rectifier (i.e., Thyristor), a pulse forming network capacitor and inductor, and a current limiting resistor.

Figure 15:
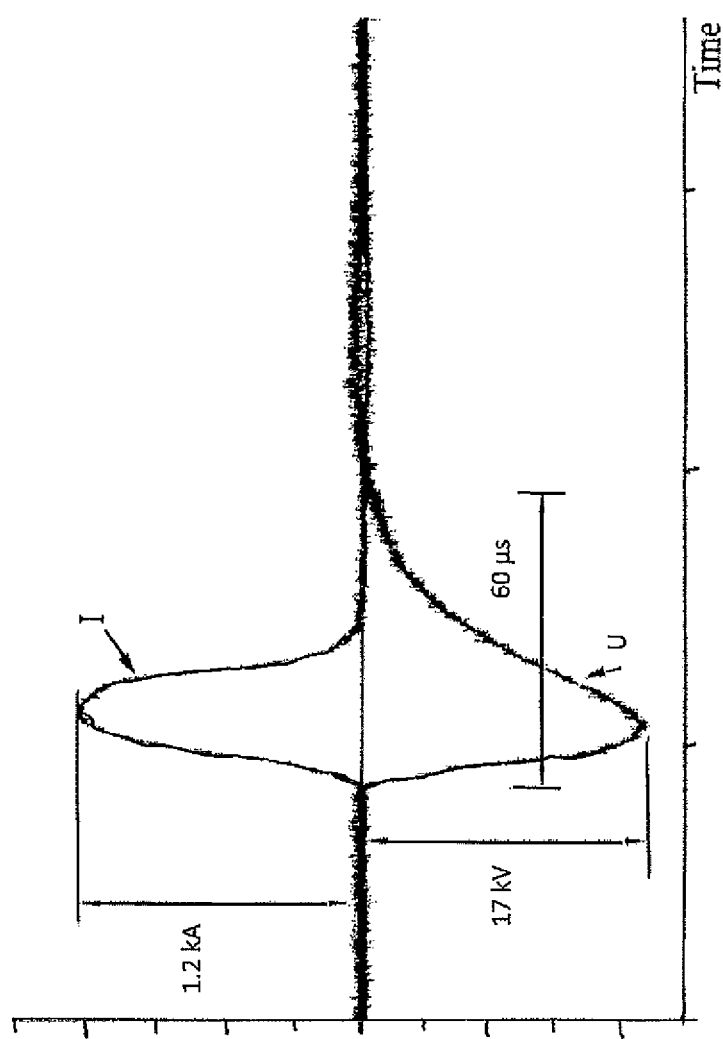
FIG. 15 is a graph of a profile of voltage and current used to generate the high frequency plasma spark discharge used in the study, with U=voltage, I=current, T=60 µs, and f=8 Hz.
Figure 16:
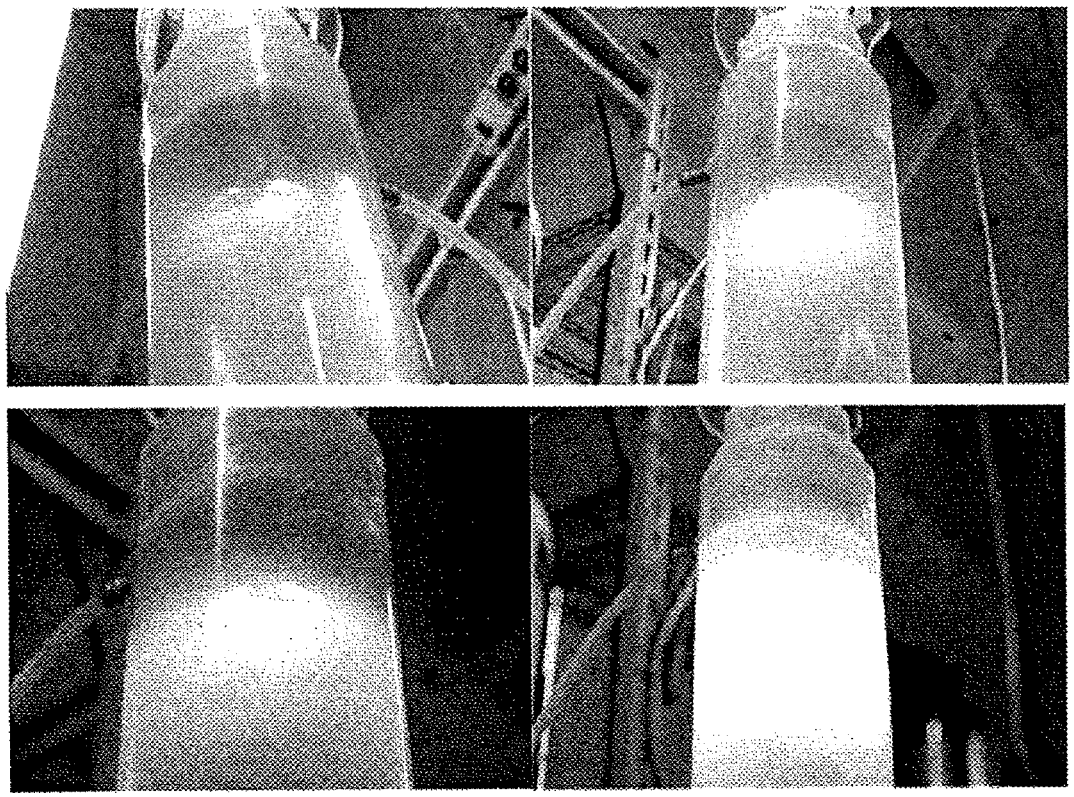
FIG. 16 shows plasma spark discharge in produced water.

FIG. 15 shows voltage and current profiles produced by the DC HV power supply of FIG. 14, which were measured and recorded by a digital phosphor oscilloscope (TDS3014C, Tektronix). For the measurement of the current, a magnetic core current probe was utilized (CM-10-L, Ion Physics Corporation, Fremont, N.H.), whereas the voltage was measured using a high voltage probe (P6015A, High Voltage Probe 1000X 75 MHz, Tektronix). Peak-to-peak voltage (U) and current (I) were determined to be 1.7 kV (based on settings of 1.6 V per division×1000 for the voltage probe) and 1.2 kA (based on settings of 2.5 A per division×10 A/V for the current probe). The frequency (f) of HV pulses was 8 Hz, a value that was determined using pulse period (T) of 60 μs measured with the oscilloscope.

The energy in a spark pulse was calculated using two different methods: (1) Energy (J per pulse)=$0.5\ CV^2$=$0.5(8\ microF)(3\ kV)^2$=36 J/pulse, and (2) Energy (J per pulse)=$\int U(t)I(t)dt$=80 J/pulse.

Reservoirs A and B were repeatedly cleaned after each test with Clorox bleach solution and tap water and dried. Initial concentrations of APB and SRB varied from $10^3$ to $10^7$ cfu/mL for both static and dynamic tests. The cfu counts in all water samples were estimated using the most probable number (MPN) method. Prior to the start of each dynamic test, produced water was recirculated through reservoir A via a bypass line for 5 minutes in order to provide a uniform dispersion of bacteria. Pre-treated produced water samples were taken from both reservoir A and the line just before spark discharge, and were immediately incubated. Three repeat samples were then taken from reservoir B (post spark discharge) for each dynamic test, and left to sit for 24 hours before being incubated.

In the static tests, two water samples were collected at each time interval for cfu counts at t=1, 3, 5, 8, 10, and 15 minutes during the plasma treatment. One of each set of two samples was incubated immediately, while the other of each set of samples was left to sit for 24 hours before being incubated, to test for residual effects of the plasma treatment.

Figure 17:
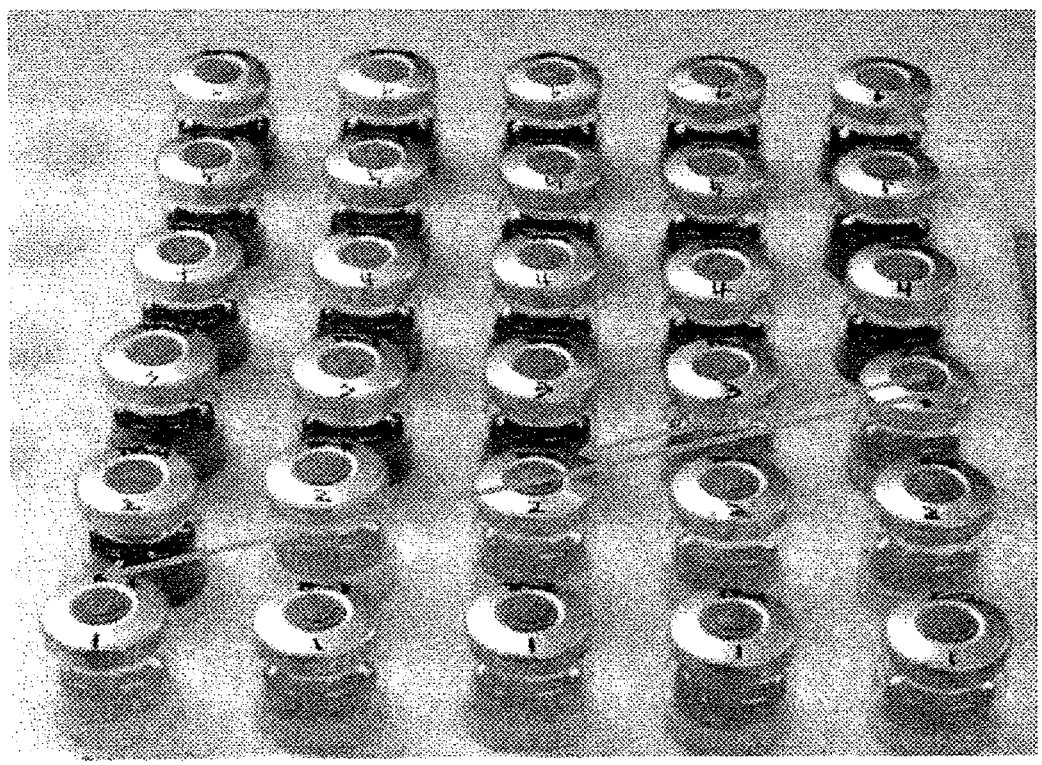
FIG. 17 shows APB test results that achieved a 2-log reduction in concentration after 10 minutes of plasma spark discharge treatment in a static test.

In the case of APB, concentration, measurements were made using a serial dilution of each sample 7 times, with phenol red dextrose added to each dilution vial. The samples were then incubated for 14 days at 35° C. After the incubation period, the APB concentration in cfu/mL was determined by how many of the vials within the serial dilution had turned from red to yellow (dark to light colored), indicating a positive reading of the presence of APB, as shown in FIG. 17.

Figure 18:
FIG. 18 shows SRB test samples subjected to plasma spark discharge treatments over periods varying from 0 to 10 minutes after 3 days of incubation in a static test.

In the case of SRB, concentration measurements were made by adding a modified postgate's medium B to the water sample, then incubating it for 10 days at 35° C. The sample was deemed positive for SRB if the color of the water had changed from its original semi-transparent state to completely opaque and black, as seen in FIG. 18. the exact concentration of SRB within the sample was determined based on how many days it took the sample to become opaque.

Figure 19:
FIG. 19 is a graph showing results from the static test plotted versus treatment time.

FIG. 19 shows the log reduction results over time due to the applied spark discharge in the static treatment test using a 1.8 L reservoir. After this test was run for 10 minutes, samples were incubated both immediately (0 h) after they were obtained as well as 24 hours post plasma treatment (24 h) to determine if any residual effects were noted in inactivating the bacteria.

The SRB concentrations consistently dropped during the period of plasma treatment for both the 0-h and 24-h groups of samples. In the case of immediate incubation (with an initial SRB concentration of $10^4$ cfu/mL), there was a 4-log reduction in the cfu count after a plasma treatment of 10 minutes, resulting in the complete inactivation of SRB in the produced water.

The APB concentrations also consistently dropped during the period of plasma treatment for both the 0-h and 24-h groups of samples. In the case of immediate incubation (with initial APB concentration of $10^4$ cfu/mL), there was a 2-log reduction in the cfu count after a plasma treatment of 3 minutes. However, unlike the SRB concentration, the APB was not completely inactivated.

The energy cost [kJ/L per 1-log reduction] for the plasma treatment was determined using the value of energy density [kJ/L] and dividing it by the total number of microbial logs reduced. For the aforementioned static plasma treatment test, the energy cost of a 21.3 and a 64.0 kJ/L/1-log reduction were obtained for each of the 0-h and 24-h incubation cases, respectively.

Of 25 total static plasma-treated samples, varying plasma treatment time from 1 to 15 minutes and where both 0-h and 24-h samples were incubated, 4 sample times showed a decrease in APB concentration between 0-h and 24-h samples. In the case of SRB, 10 of 25 sample times showed a decrease in concentration between 0-h and 24-h samples.

In summary, the spark discharge in the static treatment tests was shown to be effective in dramatically reducing the microbial cfu count. The residual 24-hour time did not prove to consistently be a major factor in further reducing microbial counts. In one case, the plasma spark discharge was able to completely inactivate SRB, albeit at a relatively high energy cost.

Figure 20:
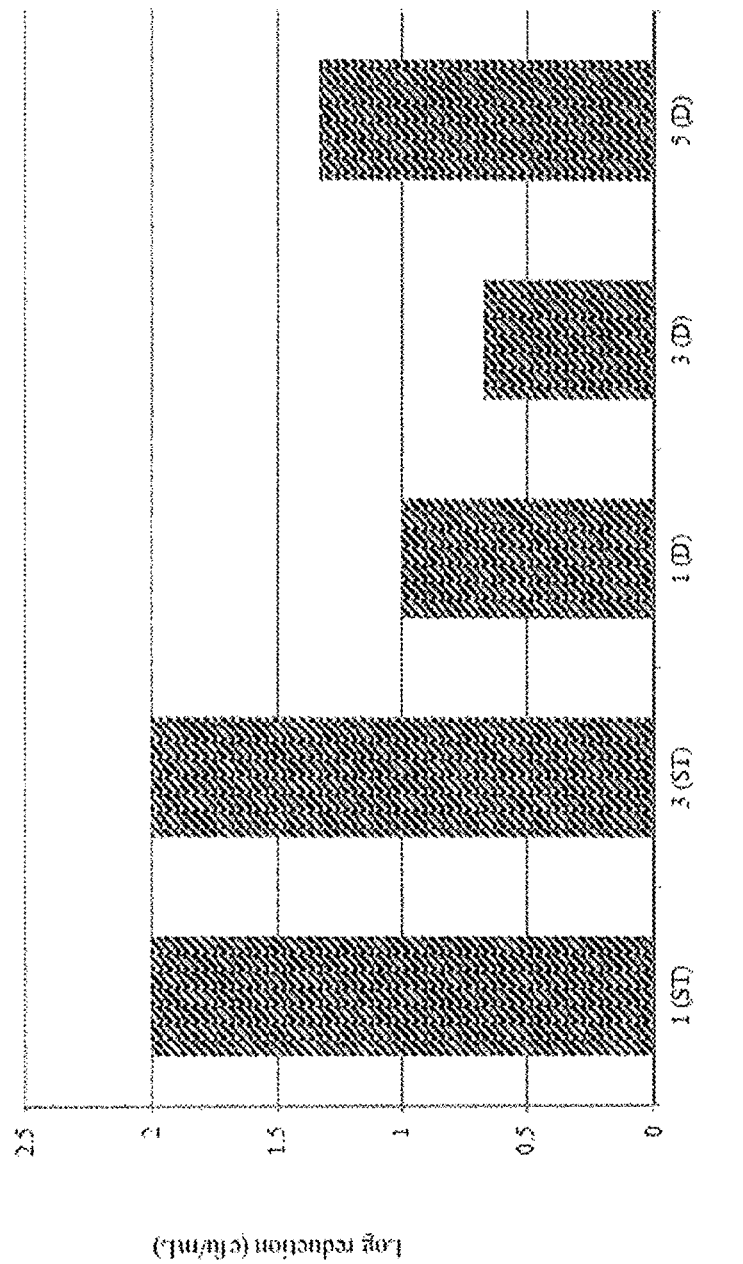
FIG. 20 is a graph showing results from the dynamic test plotted versus flow rate.

APB cfu results before and after applied plasma spark discharge in dynamic treatment tests applied to relatively clear, semi-transparent produced water can be seen in FIG. 20. These tests were run at 1 and 3 gpm for 60 seconds (with an initial APB concentration of $10^7$ cfu/mL in both cases). Each test was repeated three times, giving a 2±1 log reduction of APB concentration after plasma treatment for both the 1 and 3 gpm flow rates. This resulted in corresponding energy costs of 5.1 and 1.7 kJ/L/1-log reduction, respectively.

FIG. 20 also shows the APB cfu results before and after plasma spark discharge was applied in dynamic treatment tests to opaque and dark produced water. These tests were run at 1, 3, and 5 gpm, each for duration of 60 seconds, and each test was repeated three times. In the case of the 1-gpm flow rate (with initial APB concentration of $10^4$ cfu/mL), a 1-log reduction was observed that corresponded to an energy cost of 10.1 kJ/L/1-log reduction. In the case of the 3-gpm flow rate (with initial APB concentration of $10^4$ cfu/mL), a 0.7-log average reduction was observed that corresponded to an energy cost of 4.8 kJ/L/1-log reduction. In the case of the 5-gpm flow rate (with initial APB concentration of $10^5$ cfu/mL), a 1.3-log average reduction was observed that corresponded to an energy cost of 1.5 kJ/L/1-log reduction.

It is noted, however, that SRB concentrations remained unchanged in all dynamic treatment tests, maintaining a constant $10^4$ cfu/mL throughout. Hence, the energy costs for the dynamic tests were strictly based on APB reductions.

Figure 21:
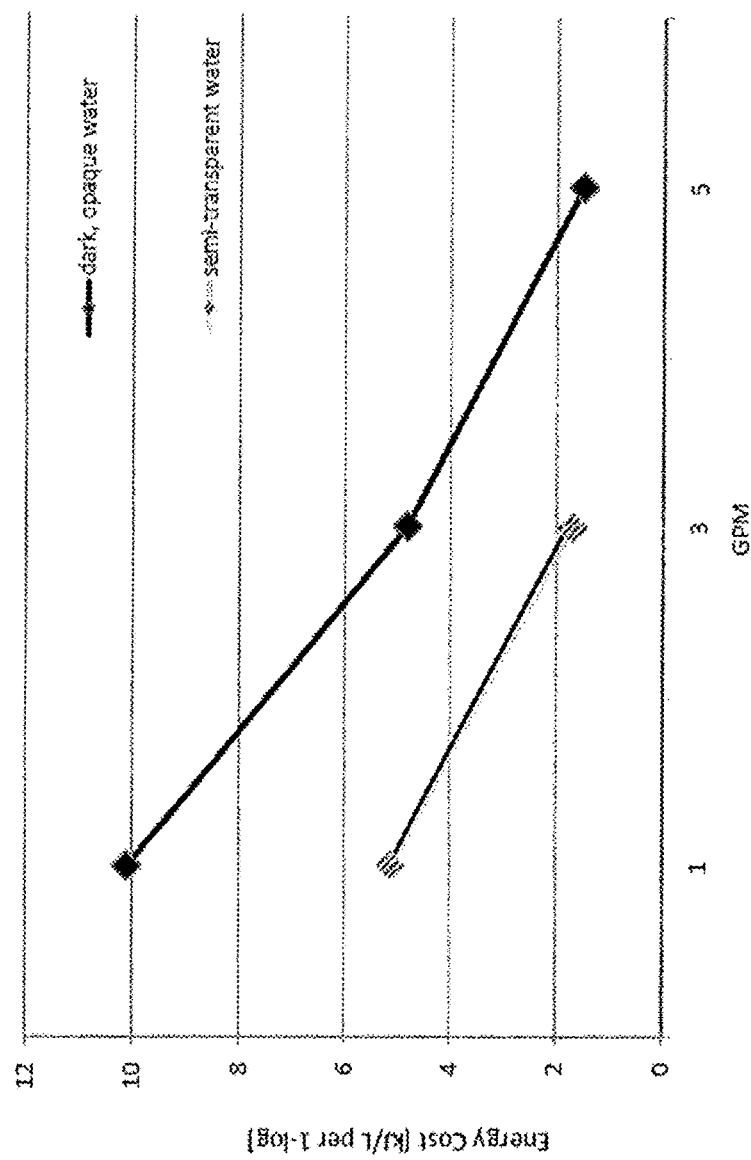
FIG. 21 is a graph showing energy cost in the dynamic test.

FIG. 21 shows the energy cost obtained from the dynamic plasma spark discharge treatment tests. From this it can be concluded that the higher the flow rate, the lower the energy cost obtained. It is also shown that APB inactivation was more efficient in the semi-transparent, clear produced water, a fact that could possibly be attributed to greater UV irradiance in clear water, as opposed to opaque, black water.

Experimental results in the study indicate that both reactive species and UV radiation produced from spark discharge play a key role in the inactivation of APB and SRB in produced water. The study also evaluated the residual effect of the reactive species in plasma-treated water after the plasma treatment was completed. In static spark discharge experiments, it was shown that a 4-log reduction in bacterial concentration could be achieved, completely inactivating SRB in this case. In dynamic spark discharge experiments, it was shown that an energy cost of 1.5 kJ/L/1-log reduction for APB can be achieved. There have been a number of studies on inactivation by plasma with corona, capillary discharge and dielectric barrier discharge (DBD) employed directly in water. The energy costs varied from 3.3 to 33.3 kJ/L per 1-log reduction in these methods.

The most efficient energy cost was 1.5 kJ/L per 1-log reduction in this study, indicating that the present method of bacterial inactivation has the potential to be the most energy-efficient system for bacterial inactivation.

The results of the present study showed that dynamic flow tests gave more uniform and efficient APB inactivation as compared to the static discharge tests, indicated by the greatly improved D-values for the higher flow rates. This may be attributed to the fact that both the reactive oxygen species (ROS) and reactive nitrogen species (RNS) produced by the spark discharge were able to be dispersed throughout the entire volume of produced water, as a result of better and more uniform mixing. In addition, the energy cost results from dynamic tests indicate that UV radiation produced from spark discharge also plays a key role in APB inactivation. This is supported by the smaller energy costs obtained in semi-transparent produced water.

However, when comparing SRB reductions obtained in static and dynamic treatment tests, it becomes apparent that the main mechanism of SRB inactivation is UV radiation. In static tests, SRB reductions were first seen after 3 minutes of plasma treatment (3-5 min. of UV exposure). In dynamic tests, the maximum UV exposure time for SRB located in the water was roughly 30 seconds, at a flow rate of 1 gpm, which was too short for meaningful reductions in SRB concentration.

Since no consistent additional residual reductions were seen when sample incubation was delayed 24 hour for both APB and SRB, it can be said that reactive species with longer half-lives, i.e. $H_2O_2$ and $O_3$, either were not sufficiently produced by the spark discharge, or were not major contributors the bacterial inactivation.

It is to be understood that even though numerous characteristics and advantages of the present invention have been set forth in the foregoing description, together with details of the method, composition and function of the invention, the disclosure is illustrative only, and changes may be made in detail, within the principles of the invention to the full extent indicated by the broad general meaning of the terms in which the appended claims are expressed.

Although the invention has been described using relative terms such as "down," "out," "top," "bottom," "over," "above," "under" and the like in the description and in the claims, such terms are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Unless stated otherwise, terms such as "first" and "second" are used to arbitrarily distinguish between the elements such terms describe. Thus, these terms are not necessarily intended to indicate temporal or other prioritization of such elements. Further, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

Other embodiments of the present disclosure will be apparent to those skilled in the art from consideration of the specification and practice of the embodiments disclosed herein. It is intended that the specification and examples be considered as exemplary only, with a true scope of the disclosure being indicated by the following claims.

All documents mentioned herein are hereby incorporated by reference in their entirety or alternatively to provide the disclosure for which they were specifically relied upon.

The foregoing embodiments are susceptible to considerable variation in practice. Accordingly, the embodiments are not intended to be limited to the specific exemplifications set forth hereinabove. Rather, the foregoing embodiments are within the spirit and scope of the appended claims, including the equivalents thereof available as a matter of law.

The following references are provided and included herein by reference.

REFERENCES

[1] Sato, M., T. Ohgiyama, and J. Clements, *Formation of chemical species and their effects on microorganisms using a pulsed high-voltage discharge in water*. IEEE Trans. Ind. Appl., 1996. 32(1): p. 106-112.
[2] Laroussi, M., *Low Temperature Plasma Based Sterilization: Overview and State-of-the-Art*. Plasma Processes and Polymers, 2005. 2(5): p. 391-400.
[3] Locke, B. R. and K.-Y. Shih, *Review of the methods to form hydrogen peroxide in electrical discharge plasma with liquid water*. Plasma Sources Science and Technology, 2011. 20(3): p. 034006.
[4] Rice, R. G. and J. F. Wilkes, *Fundamental Aspects of Ozone Chemistry in Recirculating Cooling Water Systems—Data Evaluation Needs*. Ozone Sci. Eng., 1992. 14(4): p. 329-365.
[5] Pryor, W. A., *Oxy-radicals* and *related* species: *their formation, lifetimes*, and *reactions*. Annual Review of Physiology, 1986. 48(1): p. 657-667.
[6] Sies, H., *Strategies of antioxidant defense*, in *EJB Reviews* 1993. 1994, Springer. p. 101-107.
[7] Anpilov, A., et al., *Electric discharge in water as a source of UV radiation, ozone and hydrogen peroxide*. J. Phys. D: Appl. Phys., 2001. 34(6): p. 993-999.
[8] Labas, M. D., et al., *Kinetics of bacteria inactivation employing UV radiation under clear water conditions*. Chem. Eng. J., 2006. 121: p. 135-145.

What is claimed is:

1. A plasma spark discharge reactor comprising:
a HV electrode having a head;
a ground electrode surrounding at least a portion of the HV electrode; and
a gas passage extending longitudinally through the HV electrode to an outlet at a location proximate to the head of the HV electrode.

2. The plasma spark discharge reactor of claim 1, wherein the HV electrode and the ground electrode are co-axial.

3. The plasma spark discharge reactor of claim 1, further comprising an insulator.

4. The plasma spark discharge reactor of claim 1, wherein the reactor further comprises a side passage fluidly connected to the gas passage and the side passage extends at an angle from the gas passage to an outlet proximate to the head of the HV electrode.

5. The plasma spark discharge reactor of claim 1, wherein the HV electrode and ground electrode are oriented substantially vertically.

6. The plasma spark discharge reactor of claim 1, wherein the HV electrode and ground electrode partially enclose a space between the HV electrode and ground electrode in a manner which retains gas in the space as a result of buoyancy.

7. A plasma spark discharge reactor comprising:
a HV electrode having a head;
a ground electrode surrounding at least a portion of the HV electrode;
a gas passage extending to an outlet at a location proximate to the head of the HV electrode, and
an insulator, and wherein the gas passage extends longitudinally through the insulator.

8. A plasma spark discharge reactor comprising:
a HV electrode having a head;
a ground electrode surrounding at least a portion of the HV electrode; and
a gas passage extending to an outlet at a location proximate to the head of the HV electrode, wherein the reactor further comprises a plurality of side passages fluidly connected to the gas passage and the side passages each extend at an angle from the gas passage to an outlet proximate to the head of the HV electrode.

9. The plasma spark discharge reactor of claim 8, wherein the gas passage extends longitudinally through the HV electrode.

10. The plasma spark discharge reactor of claim 8, wherein the gas passage extends longitudinally in an area between the ground electrode and the HV electrode.

11. A plasma spark discharge reactor comprising:
a HV electrode having a head;
a ground electrode surrounding at least a portion of the HV electrode; and
a gas passage extending to an outlet at a location proximate to the head of the HV electrode, wherein the head of the HV electrode is rounded.

12. A water treatment system comprising,
a chamber for holding produced water; and
a plasma spark discharge reactor comprising:
a HV electrode with a head;
a ground electrode surrounding at least a portion of the HV electrode; and
a gas passage extending to an outlet a location proximate to the head of the HV electrode.

13. The water treatment system of claim 12, wherein the gas passage extends longitudinally through the HV electrode.

14. The water treatment system of claim 12, wherein the gas passage extends longitudinally in an area between the ground electrode and the HV electrode.

15. The water treatment system of claim 12, further comprising an insulator.

16. The water treatment system of claim 15, wherein the gas passage extends longitudinally through the insulator.

17. The water treatment system of claim 12, wherein the plasma spark discharge reactor is oriented substantially vertically.

18. The water treatment system of claim 12, wherein the plasma spark discharge reactor is oriented substantially horizontally.

19. The water treatment system of claim 12, comprising a plurality of plasma spark discharge reactors.

20. The water treatment system of claim 12, wherein the head is rounded.

* * * * *